(12) United States Patent
Brown

(10) Patent No.: US 9,758,198 B2
(45) Date of Patent: Sep. 12, 2017

(54) METHODS AND APPARATUS FOR CONVERTING A FLATBED TRUCK BODY INTO A DROPSIDE BODY

(71) Applicant: Ronald Allen Brown, Kona, HI (US)

(72) Inventor: Ronald Allen Brown, Kona, HI (US)

(*) Notice: Subject to any disclaimer, the term of this patent is extended or adjusted under 35 U.S.C. 154(b) by 0 days.

(21) Appl. No.: 15/408,329

(22) Filed: Jan. 17, 2017

(65) Prior Publication Data

US 2017/0120962 A1    May 4, 2017

(51) Int. Cl.
*B62D 33/02* (2006.01)
*B62D 33/033* (2006.01)
*B62D 33/03* (2006.01)

(52) U.S. Cl.
CPC ......... *B62D 33/0207* (2013.01); *B62D 33/03* (2013.01); *B62D 33/033* (2013.01)

(58) Field of Classification Search
CPC .......................... B62D 33/033; B62D 33/0207
USPC .................................................. 296/14, 26.07
See application file for complete search history.

(56) References Cited

U.S. PATENT DOCUMENTS

| | | | |
|---|---|---|---|
| 709,193 A * | 9/1902 | Barson | 193/41 |
| 1,073,790 A | 9/1913 | Borga | |
| 1,166,877 A * | 1/1916 | Younce | B62D 33/02 296/14 |
| 2,172,027 A | 9/1939 | Mashak | |
| 2,760,812 A | 8/1956 | Richner | |
| 3,091,193 A | 5/1963 | Thomas | |
| 3,741,605 A * | 6/1973 | Lee | B60P 3/42 296/10 |
| 4,216,988 A | 8/1980 | Weiss | |
| 4,328,988 A * | 5/1982 | Patterson | B62D 33/03 296/10 |

(Continued)

FOREIGN PATENT DOCUMENTS

| | | |
|---|---|---|
| AU | 2004100407 A4 | 7/2004 |
| DE | 19620918 A1 | 11/1997 |

(Continued)

OTHER PUBLICATIONS

Cabover Engine Trucks: http://www.flickriver.com/photos/jacksnell707/sets/72157621740682312/.

(Continued)

*Primary Examiner* — Pinel Romain
(74) *Attorney, Agent, or Firm* — Seth M. Reiss, AAL, ALLLC

(57) ABSTRACT

Methods, apparatus and kits for converting a flatbed truck body into a dropside truck body, are described. According to one embodiment, the apparatus comprises modified strap hinges used in combination with securement means and panels. The methods comprise securing within stake pockets formed within the load bed of flatbed truck body one strap of the modified strap hinge, with the opposed strap secured to side panels and rear panels. The panels are then secured, one to the other and to the headboard of the flatbed, using releasable latches. The truck body, so modified, facilitates loading and unloading, as, for example, by forklift, accommodates oversized loads, and provides an accessible work surface for tradesmen. The conversion is quick, easy and inexpensive to implement making dropside trucks available to consumers who might not otherwise be in a position to acquire one.

13 Claims, 4 Drawing Sheets

(56) References Cited

U.S. PATENT DOCUMENTS

| | | | | |
|---|---|---|---|---|
| 6,644,708 B1* | 11/2003 | Grzegorzewski | ......... | B60P 1/43 |
| | | | | 296/10 |
| 6,758,514 B1* | 7/2004 | Walkden | ................ | B62D 33/02 |
| | | | | 296/165 |
| 9,085,332 B2* | 7/2015 | McBride | .............. | B62D 33/023 |
| 9,227,675 B1* | 1/2016 | Elquest | ................ | B62D 33/033 |
| 2005/0067849 A1 | 3/2005 | Walkden | | |
| 2009/0214325 A1* | 8/2009 | White | ..................... | B60P 1/435 |
| | | | | 414/537 |

FOREIGN PATENT DOCUMENTS

| | | |
|---|---|---|
| DE | 29916499 U1 | 12/1999 |
| EP | 2708450 A1 | 3/2014 |
| KR | 20140121230 A | 10/2014 |

OTHER PUBLICATIONS

Fiat Doblo Gets a Dropside Work Up: http://www.autoblog.com/2011/08/31/fiat-doblo-gets-a-dropside-work-up/.
Dadi BDD1022DE Pioneer Drop-Side Single Cab pickup truck: www.china-pickup.com/catalogue/title/dadi-bdd1022de-pioneer-drop-side.
2011 Toyota Hilux 2.5 D4D S/C Dropside LWB: https://www.olx.co.za/ad/2011-toyota-hilux-2-5-d4d-s-c-dropside-lwb-IDUGNsV.html.
Hilux Tray Body Product Range: http://www.northpointtoyota.com.au/-/toyota/lib/pdfs/Hilux%20Tray%20Body%20Product%20Range.pdf.

* cited by examiner

STEP

Insert the bent end 22 of the modified strap hinges 20 into stake pockets 18 and secure them therein using spacers, shims, or other attachment means.

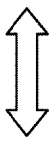

STEP

Affix the opposing end 24 of the modified strap hinges 20 onto a right side 32R, a left side 32L and a rear 34 panel, by screwing, bolting or other securement means.

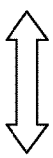

STEP

Affix releasable corner latches 36C and releasable straight latches 36S to the sides of the right side 32R, left side 32L and rear 34 panels, and to the right and left side of the headboard 16.

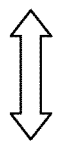

OPTIONAL STEP

Test drive and further adjust and re-secure bent ends 22 of the modified strap hinges 20 within stake pockets 18.

FIG. 6

METHODS AND APPARATUS FOR CONVERTING A FLATBED TRUCK BODY INTO A DROPSIDE BODY

BACKGROUND OF THE INVENTION

Technical Field

This invention relates to transport vehicles in the manner of small trucks. More particularly, the subject invention describes methods and apparatus for converting a flatbed truck body into a dropside truck body.

Background Art

The Problem

A pickup truck whose load bed has hinged side panels, at the sides and at the rear, is commonly known as a "dropside" pickup, and is highly favored by tradesmen as their work vehicle. To facilitate access to the load bed, the rear and side panels rotate downward 180 degrees, and may remain in the lowered position during transport, thus easily accommodating overhanging cargo on the resulting flatbed configuration. Also, with the hinged panels in the lowered position, the flatbed becomes a useful jobsite work platform for fabricating/assembly operations, as a saw table, or for laying out a set of plans.

Once you have owned a dropside "you can never go back" to a standard (USA) pickup "box", which accommodates less cargo, and which cannot readily be loaded from the sides, especially with a forklift.

Dropside bodies are the norm in Europe and Asia but they are rare in the U.S., because all U.S. truck-body manufacturers seem to be stuck in the time-warp of a "stake-bed" design, little changed from a 1903 Knox: http://www.flickriver.com/photos/jacksnell707/sets/72157621740682312/. This century-old stake-bed design (aka stake rack) is still being mass produced in the U.S. despite it's being extremely inconvenient to use for work, compared to dropsides. To be sure, Asian and European vehicle manufacturers produce dropside trucks for their own domestic and export markets but, inexplicably, none currently export these most-useful vehicles into the U.S. market, as a GOOGLE search quickly reveals, e.g., http://www.autoblog.com/2011/08/31/fiat-doblo-gets-a-dropside-work-up;http://www.china-pickup.com/catalogue/title/dadi-bdd1022de-pioneer-drop-side Watching TV coverage of wars in the Middle East, one can't help but notice that the Toyota Hilux Dropside is often the vehicle of choice for the rebels, carrying both fighters and mounted weaponry, such is the versatility of dropsides, which are readily available throughout Europe and Asia. https://www.olx.co.za/ad/2011-toyota-hilux-2-5-d4d-s-c-dropside-lwb-IDUGNsV.html.

American tradesmen are faced with the Hobson's choice of accepting the U.S. offerings of a standard "pickup box" (which looks good on a showroom floor, but is ill-suited for tradesmen) or ordering a custom-made dropside, an expensive alternative. Outside the USA, Toyota offers a factory-built dropside option (a favorite of Middle East terrorists) which it calls a "tray body". Americans cannot easily buy one. http://www.northpointtoyota.com.au/-/toyota/lib/pdfs/Hilux%20Tray%20Body%20Product%20Range.pdf.

A Partial Solution

In the U.S., smaller (7'-12') platform (flatbed) truck bodies are produced in sufficient quantities by a number of aftermarket manufacturers such that for "standard" designs (with 113-year-old stake pockets), prices are quite competitive. These bodies are within the budget of most professional tradesmen who, if willing to spend the extra effort to delete the standard pickup box from a pickup truck before or after purchase of the vehicle, can install a platform body to create a flatbed truck which is substantially more useful than a standard pickup.

Sadly, all too many of these flatbed owners then choose to use the ubiquitous (and all-too-handy) stake pockets to hold wooden side panels, often homemade from 2×4's and 2×12's. Ostensibly removable, such homemade side panels are unwieldy to handle and so are seldom removed, for loading and unloading, thus increasing loading height and obstructing forklift loading from the sides. Stake-pocket-mounted side panels are thus not user friendly, and measurably increase time and effort of loading, compared to a dropside.

A better (but expensive) option (opted by perhaps 5% of flatbed purchasers) is to go the extra mile and customize the (relatively inexpensive) standard flatbed by attaching (often by welding) hinges and latches to create a dropside flatbed, the Gold standard of utility work trucks. For the one-percenters, the Platinum standard is achieved by adding a dump hoist.

But a very low percentage of U.S. flatbeds have dropsides; those 1903-era stake pockets are just too enticing, requiring little time, money, and thinking to add side panels. Thinking long term, the initial investment of creating a dropside would pay dividends over many years, due to the higher productivity of dropsides, day-in and day-out. But present laziness usually carries the day; we Americans tend to be short-sighted in such matters.

Accordingly, a primary object of the subject invention is to make dropside truck bodies more available and more easily available to those who can benefit from their use.

A further object of the subject invention is to increase the accessibility of dropside truck bodies for consumers in markets in which commercially produced dropside trucks are inaccessible, difficult to access, or are only available at very high cost.

A further object of the subject invention is to provide a method to convert a flatbed truck body into a dropside truck body that is quick, easy and inexpensive to implement.

Yet another object of the subject invention is to provide apparatus and kits that facilitate the quick, easy and inexpensive conversion of a flatbed truck body into a dropside truck.

BRIEF SUMMARY OF INVENTION

These and other objects are accomplished through the instant invention, methods and apparatus for converting a flatbed truck body into a dropside truck body, that is quick, easy and inexpensive to implement.

According to one preferred embodiment the method for quickly and inexpensively converting a conventional flatbed truck, with a load bed that has pockets along the outside edge of the bed that receive stakes, into a dropside truck comprises the steps of (1) taking conventional off-the-shelf strap hinges; (2) bending one strap of the strap hinge 90° along its length to form an offset; (3) inserting from above and securing therein the distal portion of the bent strap in the stake pockets; (4) screwing the other (unbent) side of the strap hinge onto panels that form the side and rear walls of the of the truck bed; and (5) adding conventional latches to the four corners of the panel walls to connect one panel to the adjoining panel and to the headboard that extends upward between the truck cab and the truck bed.

The apparatus of the subject invention, according to one preferred embodiment, are modified strap hinges with a 90 degree bend as above described that are used in combination with spacers and shims. One of the two hinge straps is bent 90° to create an offset with the section of the bent strap between the hinge pin and the bend of sufficient length to extend the hinge pin, when the lower portion of the bent strap is secured in place within the stake pocket, just outside the load platform. The spacers are then inserted into the stake pocket alongside one or both sides of the inserted portion of the strap, as appropriate to the particular body being converted. Once the spacers are suitably placed, the hinge can be locked in place by driving a (plastic) shim into the stake pocket. If readjustment becomes necessary, the hinge may be dislodged by tapping upward with a hammer on the tip of the hinge strap that protrudes below the stake pocket.

Once all of the hinges on a particular side of the body have been (provisionally) installed within the stake pockets, the side panel that will form the sidewall of the dropside may be temporarily clamped to the hinges such that necessary clearances and full (180-degree) rotation may be verified. At this point, the hinged panel is provisionally operable, but no fasteners have been installed, thus adjustment of hinge placement is easily accomplished. Only then are the hinges screwed to the panels.

The strap hinge with offset holds the wall panel slightly beyond the outside edge of the load bed. In this manner, the exterior surface of the panel walls will sit along the outside of the stake pockets, allowing the panel to rotate 180° about the outside edge of the stake pockets.

Panels are installed in similar manner on the opposing side and at the rear, or end gate, of the flatbed. The last step is installing the corner latches and straight latches that hold the panels one to the other and to the truck headboard. The latches are releasable latches that, when released, allow the sidewalls and end gate to rotate to a downward position, and when latched, support the sidewalls and end gate upwards in order to contain cargo for transport.

After a few test drives of the truck vehicle, the owner checks that body twist, road bumps, etc., have not loosened the hinges. If there is concern about this, a small hole can be drilled through the stake pockets, wherein a roll pin, nail, or screw could be installed, for peace of mind.

The instant invention also comprises a kit having a plurality of formed hinges, spacers, shims and latches sized to fit specific makes and models of flatbed truck bodies. These kits optionally include the panels themselves made of aluminum, plastic composites, or wood.

One aspect of the instant invention is methods to quickly, conveniently and inexpensively convert flatbed truck bodies into dropside truck bodies.

A further aspect of the instant invention is apparatus, including a modified strap hinge, spacers, shims and panels, used in the methods of the instant invention to quickly, conveniently and inexpensively convert flatbed truck bodies into dropside truck bodies.

Yet a further aspect of the instant invention are kits that comprise the apparatus used in the method of the instant invention to quickly, conveniently and inexpensively convert flatbed truck bodies into dropside truck bodies.

DESCRIPTION OF THE DRAWINGS

FIG. 6 is a schematic showing the steps of the methods of the subject invention.

DETAILED DESCRIPTION OF PREFERRED EMBODIMENTS

Figure 1:
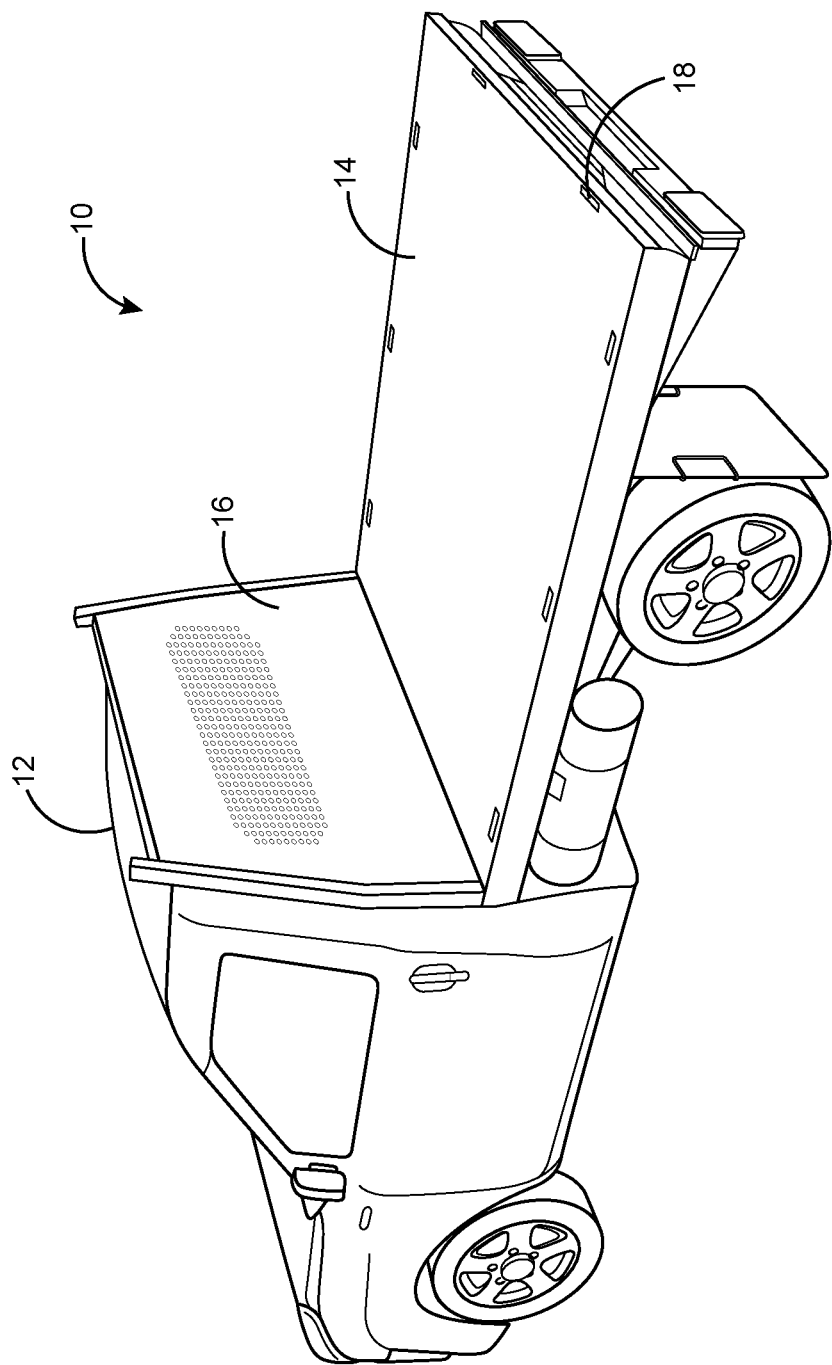
FIG. 1 is a perspective view of a flatbed truck having a load bed with stake pockets formed therein, and headboard.

Depicted in FIG. 1 is a flatbed truck 10 having a cab 12, a load bed 14, a headboard 16 along the front of load bed 14 that separates load bed 14 from cab 12, and a plurality of stake pockets 18 formed within load bed 14 spaced apart along the two sides and the rear of load bed 14.

Figure 4:
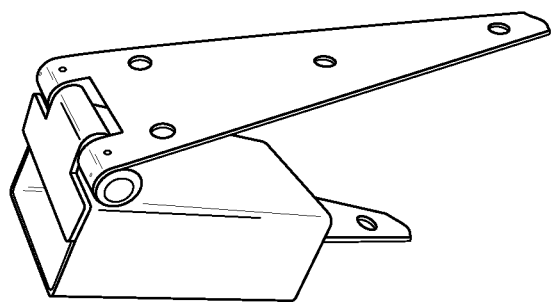
FIGS. 2 through 4 are perspective views of one embodiment of the apparatus of the subject invention, a modified strap hinge, being inserted into a stake pocket.
Figure 3:
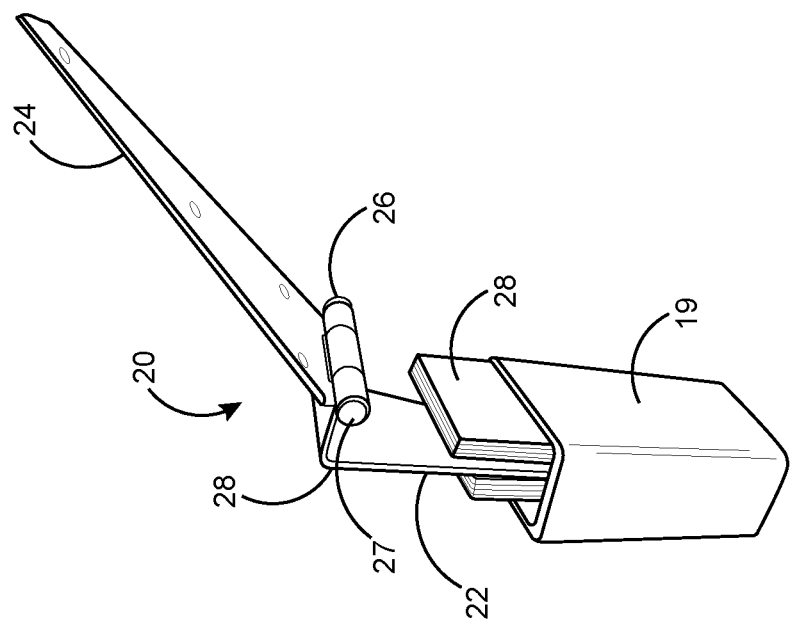
Figure 2:
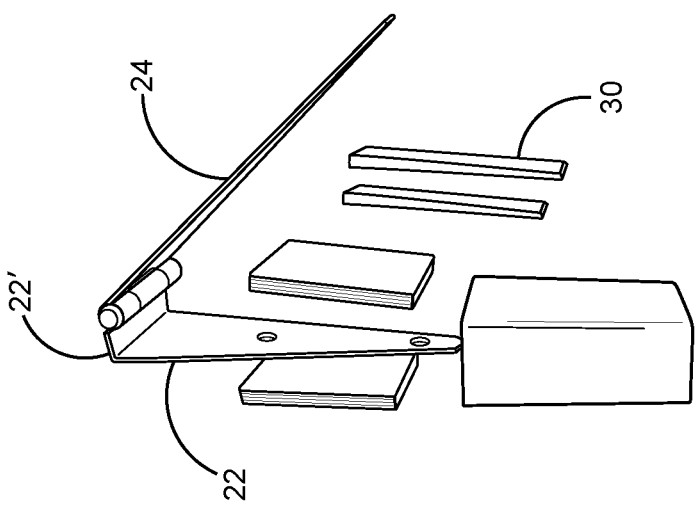

Depicted in FIGS. 2 through 4 is one embodiment of the apparatus of the subject invention, a modified strap hinge 20. Strap hinge 20 is comprised of two elongated substantially planar straps 22 and 24 that extend outward from a hinge 26 containing a hinge pin 27. Strap 24 is unbent. Strap 22 is bent at a ninety degree angle at a specific point 28 along its length.

Still referring to FIGS. 2 through 4, an offset 22', created by bending strap 22 ninety degrees at bend 28, has a length that is greater than the distance between stake pocket 18 and the outside edge of load bed 14 as illustrated in FIG. 1.

Still referring to FIGS. 2 through 4, bent strap 22 is inserted downwards into a stake pocket body 19 and secured within stake pocket body 19 using a plurality of spacers 28 and shims 30.

The modified strap hinge 20 depicted in FIGS. 2 through 4 and described above is just one embodiment of a hinged rotation means comprising a fixed leaf and a moveable (rotatable) leaf. Bent strap 22 functions as the fixed leaf that is secured within stake pocket 18, while unbent strap 24 functions as the moveable leaf that is secured to the side and rear panels described below. Other embodiments of hinged rotation means having a fixed leaf and a moveable leaf can be employed in the instant invention in lieu of modified strap hinge 20 to provide equivalent functionality and results.

Figure 5:
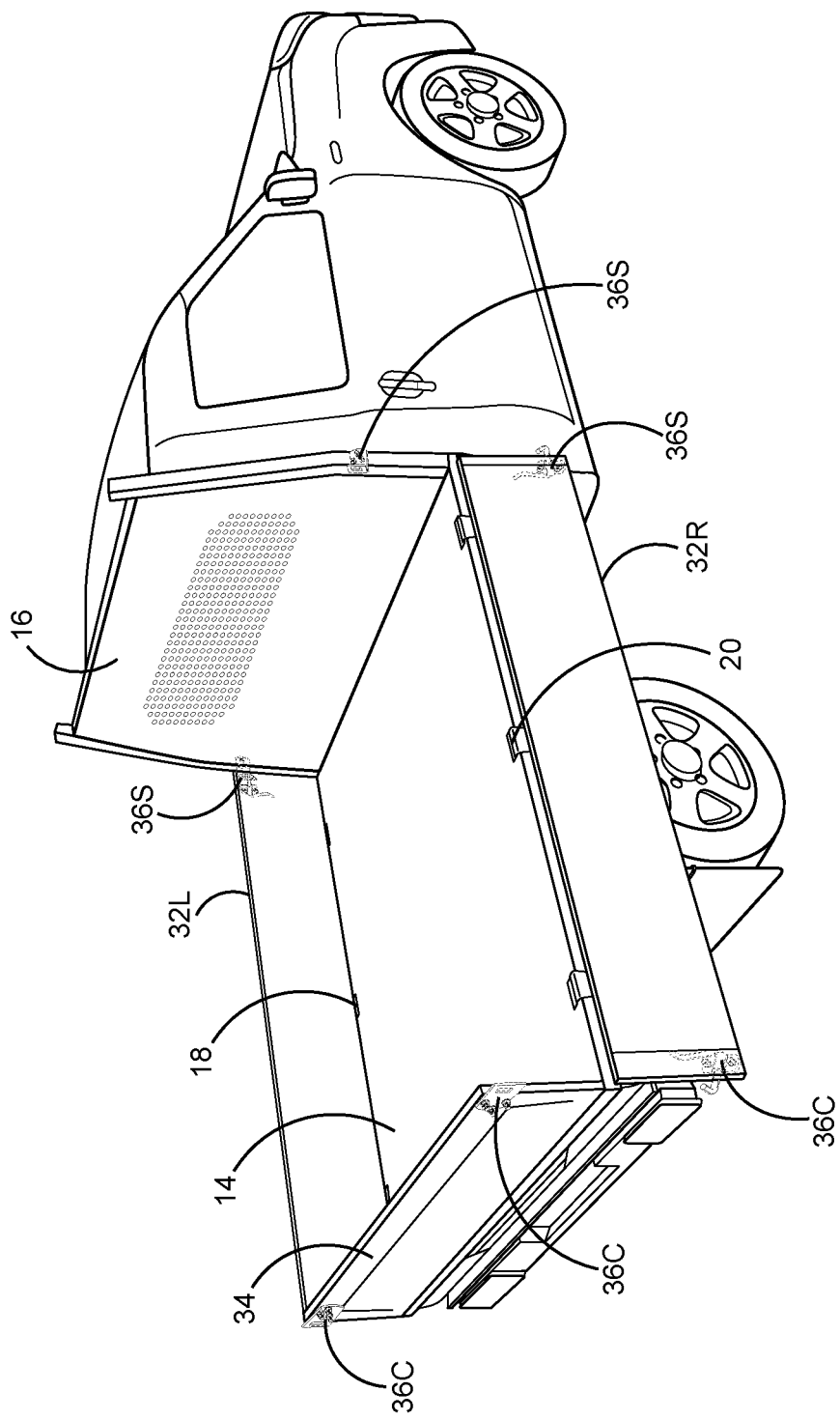
FIG. 5 is another perspective view of a flatbed truck, after conversion into a dropside truck using the method and apparatus of the subject invention.

Depicted in FIG. 5 is a dropside truck converted from a flatbed truck using the methods and apparatus of the subject invention. A plurality of modified strap hinges 20 (visible in FIG. 5 only along the right side of load bed 14) secure a left side panel 32L along the left side of load bed 14, while a plurality of modified strap hinges 20 secure a right side panel 32R along the right side of load bed 14, and a plurality of modified strap hinges 20 secure a rear panel 34 along the rear side of load bed 14. As illustrated, the left side of rear panel 34 is secured to back side of left panel 32L by a releasable corner latch 36C. A releasable straight latch 36S secures the front side of left panel 32L to the left side of headboard 16. Releasable latches 36C and 36S, when secured as shown in FIG.5 position, hold left side panel 32L and rear panel 34 in an upward position. Releasable latches 36C and 36S, when released as shown in FIG.5 position, allow right side panel 32R to rotate 180 degrees downward, accommodating loading and unloading, oversized cargo, or facilitating the use of the flatbed as a work surface.

When releaseable corner latches 36C are released and releasable straight latches 36S are secured, the truck body functions as a pickup with end gate down for loading and unloading from the rear.

It will be understood from FIG. 5 that right side panel 32R can be rotated 180 degrees upwards and secured in the upward position by securing latches 36C and 36S along the front and back of right side panel 32R. Similarly, rear panel 34 and left side panel 32L can be rotated downwards by releasing the latches 36C and 36S along the front and back side of left side panel 32L.

Also illustrated in FIG. 5 is how the modified strap hinge 20 secures side panels 32L and 32R, and rear panel 34, onto load bed 14 and allows the panels to pivot freely around the outside edges of load bed 14 without binding. Because the length of the offset 22' between bend 28 and hinge 26 (shown in FIGS. 2 and 3) exceeds the distance between stake pocket 18 and the outside edge of load bed 14, hinge 26 and hinge pin 27 is positioned just outside the edge of load bed 14, supporting the side and back panels while allowing them to fully rotate, 180 degrees, upwards and downwards, without interference or binding.

The methods of the subject invention are illustrated in FIG. 6, a schematic diagram of the methods steps.

One of the steps of the methods of the subject invention involves inserting the bent end 22 of the modified strap hinges 20 which form the apparatus of the subject invention, into stake pockets 18 and securing them therein with spacers, shims, or other attachment means.

The further step of the methods of the subject invention is to affix the opposing end 24 of the modified strap hinges 20 onto a right side 32R, a left side 32L and a rear 34 panel, by screwing, bolting or other securement means.

A further step of the methods of the subject invention is to affix releasable laches 36C and 36S to the sides of the right side 32R, left side 32L and rear 34 panels and the right and left side of the headboard 16 that are available to connect the various panels to one another and to the truck headboard to form a truck bed that functions in the manner of a pickup truck, and that can be released to form a truck bed that functions in the manner of a flatbed truck.

An optional final step is to further adjust and re-secure the bent ends 22 of modified strap hinges 20 within stake pockets 18 after the truck has been test driven or driven.

Some or all of the above-described steps may be modified, and performed in a different order, without departing from the scope of the subject invention. So, for example, the modified strap hinges may be secured to the side and rear panels prior to being inserted into the stake pockets, latches may be affixed to the panels and/or headboard prior to mounting the panels to the flatbed, and spacers and shims may be inserted at any step along the described method. Similarly, the methods of securing and affixing the hinge straps within the stake pockets and to the panels may take on many forms, and employ any and all securement means commercially available or known to those skilled in the art.

SUMMARY AND SCOPE

As described above and illustrated in the accompanying drawings, the apparatus and methods of the subject invention convert conventional flatbed truck bodies having stake pockets formed in the load beds into much more useful and pragmatic dropside truck bodies, with very little effort or expense.

The invention allows those who desire or could benefit from the versatility and practical benefits of drop side trucks affordable access to such trucks whereas, without the invention, these consumers would either go without such trucks or spend substantially more to acquire such trucks.

Unless otherwise indicated, all numbers, dimensions, materials and so forth used in the specification and claims are to be understood as being examples and not limitations, and in any event, not as an attempt to limit the application of the doctrine of equivalents to the scope of the claims.

The terms "a," "an," "the," and similar references used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

The foregoing description of the preferred embodiment of the invention has been presented for the purposes of illustration and description. It is not intended to be exhaustive or to limit the invention to the precise form disclosed. Many modifications and variations are possible in light of the above teaching. By way of example and not limitation, the methods and apparatus of the subject invention can be applied to wagons, load storage structures and transport vehicles having flat platforms and stake pockets or their equivalent, other than trucks and truck beds. Hinged apparatus with two extending legs other than strap hinges may be used in place of the strap hinges described herein. The subject invention may be adapted so that the sidewalls are removable, etc. It is intended that the scope of the invention not be limited by this detailed description, but by the claims and the equivalents to the claims appended hereto.

Additional variations on these described embodiments will become apparent to those of ordinary skill in the art upon reading the foregoing description. The inventor expects skilled artisans to employ such variations as appropriate, and the inventor intends for the invention to be practiced otherwise than specifically described herein.

Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

The invention claimed is:

1. A method for converting a flatbed truck body, with headboard and load bed having stake pockets formed therein, into a dropside truck body comprising the steps of:
   (a) providing a strap hinge with one strap thereof bent 90° to form an offset;
   (b) inserting from above and securing therein the distal portion of said bent strap within a stake pocket of said truck body
   (c) securing the other strap of said strap hinge to a side panel;
   (d) repeating steps (a) through (c) for one or more stake pockets along one side of said flatbed;
   (e) repeating steps (a) through (c) using a second side panel along the opposing side of said flatbed;
   (f) repeating steps (a) through (c) using a rear panel along the rear side of said flatbed; and
   (g) releasably attaching the side panels to the headboard and the side panels to the rear panel.

2. The method of claim 1, wherein in step (b) the bent strap is secured within the stake pockets by means of spacers and shims.

3. The method of claim 1, wherein in step (b) the bent strap is secured within the stake pocket by permanent securement means.

4. An apparatus for converting a flatbed truck body having a load bed with stake pockets formed therein into a dropside truck body, comprising panel and a rotation means, said rotation means having a fixed leaf and moveable leaf wherein said fixed leaf is secured within said stake pocket and said moveable leaf is secured to said panel, and wherein said rotation means functions to allow approximately 180 degrees of rotation of said panel about said load bed.

5. The apparatus of claim 4 further comprising a plurality of panels and a plurality of rotation means, and wherein at least two panels are secured one on each side of said load bed using said rotation means.

6. The apparatus of claim 5 further wherein a rear panel is secured to the rear of said load bed using said rotation means.

7. The apparatus of claim 5 wherein said flatbed truck body has a headboard and further comprising releasable latches that attach said panels to said headboard to maintain said panels in an up position.

8. The apparatus of claim 6 further comprising releasable latches that attach said panels to said rear panel and maintain said panels in an up position.

9. A kit for converting a flatbed truck body having a load bed with stake pockets formed therein into a dropside truck body comprising one or more hinge means, said hinge means having a fixed leaf and a movable leaf wherein said fixed leaf is to be secured within said stake pocket and said moveable leaf is to be secured to a panel to allow approximately 180 degrees of rotation of said panel about said load bed.

10. The kit described in claim 9 further comprising panels.

11. The kit described in claim 10 wherein said panels are fabricated from a group comprising wood, plastic, aluminum, steel and composites.

12. The kit described in claim 9 further comprising spacers and/or shims.

13. The kit described in claim 10, further comprising releaseable attachment means for attaching said panels one to the other and to the truck body.

* * * * *